Aug. 27, 1957     S. D. WILTSE     2,804,318
PIPE COUPLING WITH FLUID PRESSURE SENSITIVE SLEEVE TYPE GASKET
Filed Jan. 26, 1953     2 Sheets-Sheet 1
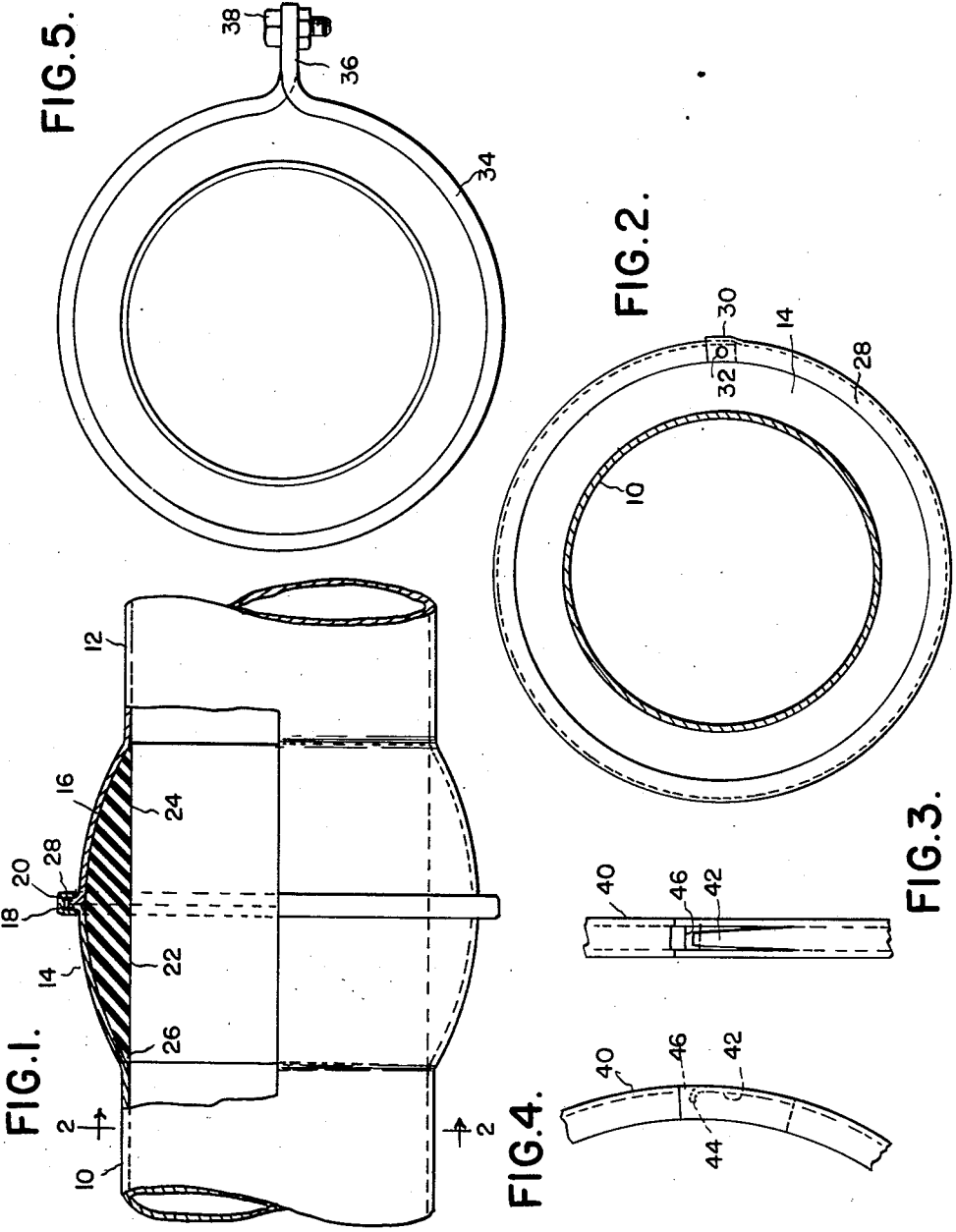
INVENTOR.
SUMNER D. WILTSE
BY Whittemore,
Hulbert & Belknap
ATTORNEYS Aug. 27, 1957   S. D. WILTSE   2,804,318
PIPE COUPLING WITH FLUID PRESSURE SENSITIVE SLEEVE TYPE GASKET
Filed Jan. 26, 1953   2 Sheets-Sheet 2

INVENTOR.
SUMNER D. WILTSE
BY Whittemore,
Hulbert & Belknap
ATTORNEYS

United States Patent Office 2,804,318
Patented Aug. 27, 1957

2,804,318

PIPE COUPLING WITH FLUID PRESSURE SENSITIVE SLEEVE TYPE GASKET

Sumner D. Wiltse, Detroit, Mich.

Application January 26, 1953, Serial No. 333,254

5 Claims. (Cl. 285—109)

The present invention relates to a flexible tube coupling.

It is an object of the present invention to provide a flexible tube coupling characterized by the ease with which the coupling between two tubes or pipes may be effected, the simplicity and efficiency of the parts, and the efficient production of a sealed mechanical interconnection between the tubes or pipes.

More specifically, it is an object of the present invention to provide a tube coupling comprising an internal annular gasket of flexible material adapted to have opposite ends inserted in the open ends of adjacent tubes or pipes so as to provide a seal in combination with means external of the ends of the pipes or tubes for mechanically interconnecting the tubes or pipes.

It is a further object of the present invention to provide a tube coupling of the character described in which the gasket has end portions of reduced wall thickness to provide for flexibility so as to produce an efficient seal as a result of pressure within the tube system.

It is a further object of the present invention to provide a tube coupling of the character described in which the ends of the tubes are enlarged to provide spheroidal chambers and in which the exterior surface of the gasket is shaped to conform to the interior surface of such chambers.

Other objects and features of the invention will become apparent as the description proceeds, especially when taken in conjunction with the accompanying drawings, wherein:

Figure 1 is a fragmentary side elevation of a tube joint constructed in accordance with the present invention, with parts in section.

Figure 2 is a section on the line 2—2, Figure 1.

Figure 3 is a fragmentary side elevation of an alternate form of coupling means.

Figure 4 is a fragmentary elevational view of the structure shown in Figure 3, looking toward the right.

Figure 5 is a sectional view similar to Figure 2 showing a modified construction.

Figure 7:
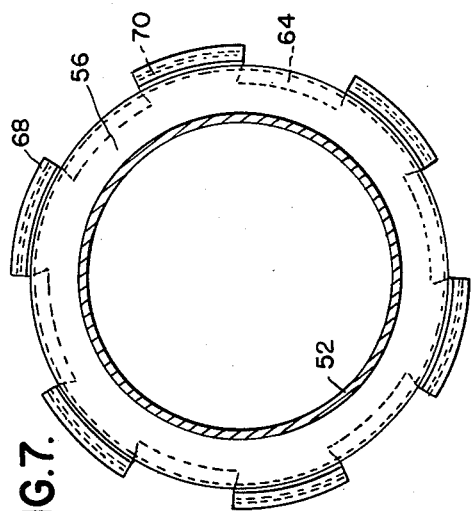
Figure 7 is a sectional view on the line 7—7, Figure 6.

In general terms, the coupling of the present invention comprises an annular elongated gasket insertable in the adjacent ends of two tubes or pipes to be coupled together. The gasket is formed of a yieldable flexible and preferably resilient material, and is in the preferred form of the invention shaped so that the opposite ends thereof are of reduced wall thickness whereby the ends of the gasket terminate in relatively thin flexible lips adapted to be pressed against the inner surface of the respective tubes by internal pressure within the system. The tubes are preferably formed with their ends expanded into spheroidal contour and the external surface of the gasket is likewise formed with a spheroidal contour to fit snugly within the enlarged ends of the tubes. The tubes are pressed onto the ends of the gasket and are provided with mechanical interlock means external thereof, which retain the tubes in assembled relation against forces tending to separate them.

The gasket may conveniently be formed of rubber or a rubber-like material, although suitable plastics have been developed which may be employed. If desired, the gasket may be permanently bonded to one of the tubes and insertable in and removable from the end of the other tube. Alternatively, the gasket may be bonded by heat and/or pressure to both of the tubes after assembly into the completed coupling.

With the foregoing general statement in mind, reference is now made to the specific embodiments of the invention illustrated in the figures.

In Figures 1 and 2 there is illustrated a joint between tubes 10 and 12, the adjacent ends of which are enlarged as indicated at 14 and 16 respectively to provide a spheroidal contour. Desirably, the center of curvature of the spheroidal portions 14 and 16 is at the axis of the tubes 10 and 12. The extreme end portions of the tubes 10 and 12 are formed outwardly to provide flanges 18 and 20 respectively.

Received within the spheroidal enlargements 14 and 16 is a sealing gasket 22 which as illustrated herein has a cylindrical passage 24 therethrough, the diameter of which is equal to the internal diameter of the tubes 10 and 12. The exterior surface of the gasket is spheroidal and is shaped to snugly engage the internal surface of the tube enlargements 14 and 16. The ends of the gasket 22, as a result of the construction just described, tapers to substantially knife edged portions 26 which are flexible and are pressed firmly against the interior surface of the tubes by internal pressure within the system.

In order to retain the tubes 10 and 12 assembled a coupling member 28 is provided which as illustrated in Figures 1 and 2, is an annular split ring of U-shaped cross-section adapted to be pressed over the outwardly projecting flanges 18 and 20, as best illustrated in Figure 1. In order to retain the ring 28 in assembled relation one end thereof, as indicated at 30, is enlarged so as to receive the opposite end of the ring and registering openings are provided through the side walls of the ring to receive a pin 32.

Alternatively, as illustrated in Figure 5, a ring 34 may be provided which may have the same U-shaped cross-section as the ring 28. In this case however, the ends of the ring extend outwardly as indicated at 36 and are adapted to be connected together by a nut and bolt indicated generally at 38.

Another variation of the means for retaining a U-shaped ring 40 in assembled relation over the flanges 18 and 20 is shown in Figures 3 and 4. In this case one end of the split ring is provided with a flexible tongue 42 having a hook portion 44 engageable in a slot 46 formed in the other end of the ring. The ring is pressed in place around the flanges 18 and 20 and the hook 44 is pressed into the slot 46.

Figures 6, 8:
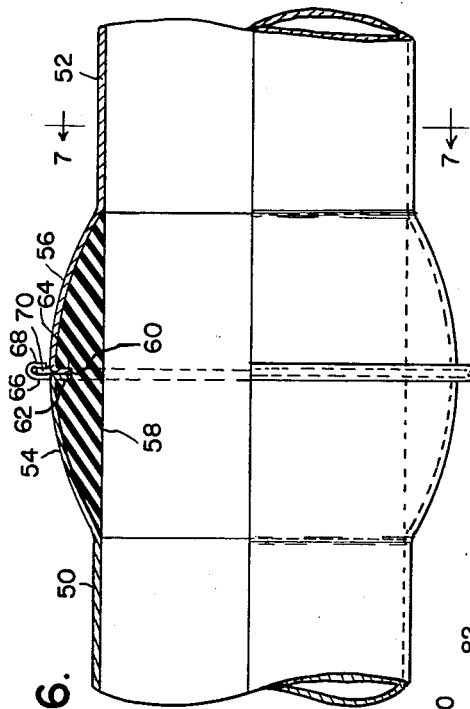
Figure 6 is a side elevational view partly in section, showing another embodiment of the present invention.
Figure 8 is an enlarged sectional view of a variation of the construction illustrated in Figures 6 and 7.

Referring now to the embodiment of the invention illustrated in Figures 6 and 7, there is shown a pair of tubes 50 and 52 which are provided with spheroidal end enlargements 54 and 56 respectively. The tube joint comprises a gasket 58 which may be in all respects identical with the gasket 22 illustrated in Figure 1 except that the gasket is provided with a central annular groove 60 located in its exterior surface.

In this case the tubes 50 and 52 are provided with circumferentially spaced segmental radially inwardly extending flanges 62 and 64 respectively. Intermediate the flanges 62 the tube 50 is provided with outwardly extending flanges 66 including reversely bent portions 68. Intermediate the flanges 64 on the tube 52 there are provided radially outwardly extending flanges 70. The tube joint illustrated in Figure 6 may be assembled by pressing the gasket 58 into one of the tube ends and thereafter pressing the other tube end over the portion of the gasket projecting from the first tube. At this time the flanges 70 will be positioned to extend between the flanges 66 and inwardly extending flange portions 68. When the parts have been pressed together they are relatively rotated so that the flanges 70 are moved into the space between the flanges 66 and the portions 68 thereof, thereby providing a secure interlock.

Referring to Figure 8 there is illustrated a modification of the invention illustrated in Figures 6 and 7 in which tubes 72 and 74 are provided with inwardly extending circumferentially spaced segmental flanges 76 and 78. The tube 72 is provided with circumferentially spaced outwardly extending segmental flanges 80 which are provided with reversely bent inwardly extending portions 82. The tube 74 is provided intermediate the flanges 78 with outwardly extending circumferentially spaced segmental flanges 84. In this case the ends of the tubes are not enlarged but are cylindrical and of the same diameter as the length of the tubes. To provide a seal a gasket 85 is provided having a cylindrical exterior and having an internal passage therethrough of variable diameter which is at a minimum at the central portion of the coupling. The internal passage through the gasket thus provides a Venturi effect and if kept within reasonable limits does not seriously affect the flow of fluid through the joint or coupling.

In this embodiment of the invention the coupling is completed by inserting the flanges 84 through the spaces between adjacent flange portions 82 and thereafter relatively rotating the tubes 72 and 74 to cause the flanges 84 to extend into the space between the flanges 80 and the reversely bent portions 82 thereof.

Figure 10:
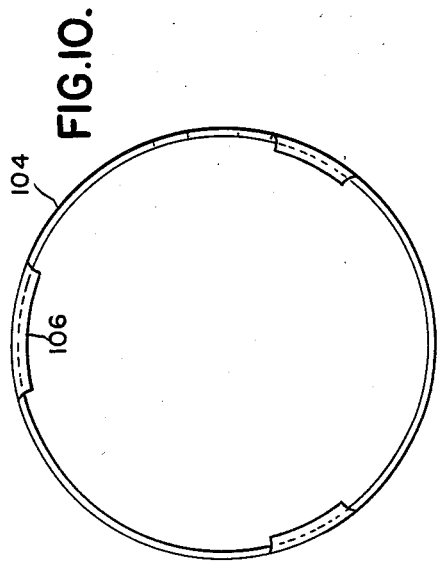
Figure 10 is an end view of the coupling ring shown in Figure 9.
Figure 9:
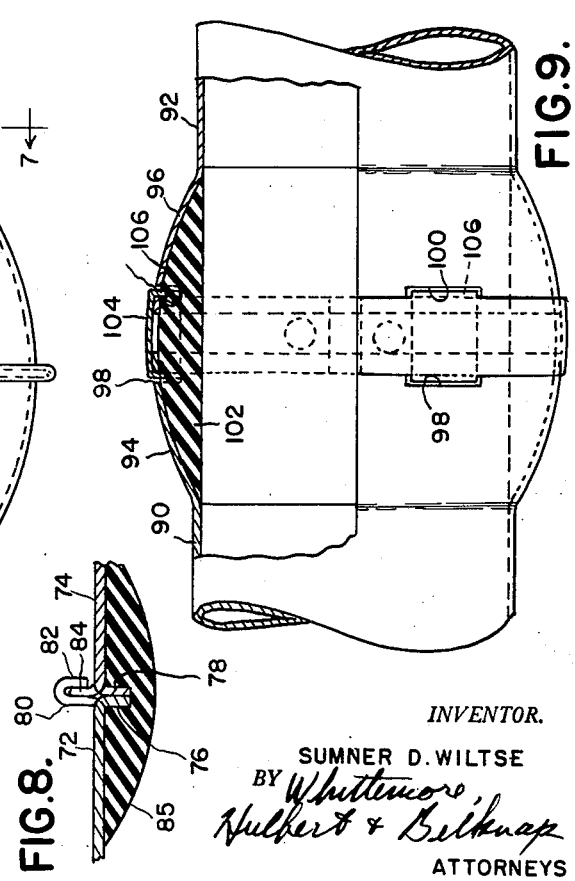
Figure 9 is a side elevation of another form of tube coupling constructed in accordance with the present invention.

Referring now to Figures 9 and 10 there is illustrated a modification of the present invention. In this case tubes 90 and 92 are provided with spheroidal enlargements 94 and 96 respectively, and adjacent the ends thereof they are provided with elongated circumferentially extending slots 98 and 100 respectively. A sealing gasket 102 is provided and may be identical with the gasket 22 described in detail in conjunction with Figure 1. In order to effect mechanical connection between the tubes 90 and 92 a split ring 104 is provided, this ring being illustrated in detail in Figure 10. The ring 104 is provided at opposite sides thereof with radially inwardly extending flanges 106 which are receivable in the slots 98 and 100. If desired, suitable means may be provided for securing the ends of the split ring 104 together although this is not strictly necessary. The tube joint or coupling may be disassembled by prying the ring 104 outwardly, after which the tubes 90 and 92 may be pulled apart.

In all of the embodiments described, the gasket may be permanently bonded to one or both of the tube ends and where the gasket is formed of rubber or a rubber-like material, as is preferred, a bond may be produced between a metal tube and the gasket which has a strength exceeding the strength of the gasket material.

In general, the invention comprises the provision of a flexible and preferably outwardly radially expansible gasket having end portions receivable in the adjacent ends of coupled tubes, the gasket being effected by internal pressure to be pressed into fluid-tight sealing engagement with the inner surfaces of the tubes. This result depends upon flexibility and preferably upon radial expansibility of the tapered lips at the ends of the gasket so that internal pressure presses these lips against the inner surface of the tube ends in tightly sealed relation. In the present invention the gasket is not relied upon for mechanical coupling but instead, separate detachable coupling means is provided exterior of the joint so as to permit ready attachment and detachment of the coupling means to the tubes.

The drawings and the foregoing specification constitute a description of the improved flexible tube coupling in such full, clear, concise and exact terms as to enable any person skilled in the art to practice the invention, the scope of which is indicated by the appended claims.

What I claim as my invention is:

1. Tube coupling construction comprising a pair of aligned rigid tubes having end portions each provided with radially inwardly and outwardly extending substantially coplanar flange portions at the ends thereof, the inwardly and outwardly extending flange portions of one of said tubes being abutted against the corresponding flange portions of the other tube, a connecting and sealing gasket of annular shape extending into the adjacent end portions of said tubes, said gasket having end portions of tapered wall thickness defined by inner and outer surfaces converging toward its ends to form thin flexible sealing lips, one of said surfaces being cylindrical, the other of said surfaces being smoothly convexly curved in axial section, the outer surface of said gasket having an annular groove intermediate its ends, the portions of said gasket at opposite sides of said groove fitting snugly within the inner surfaces of the end portions of said tubes, said inwardly extending flange portions being received in said groove and being in abutment with each other, the material of said gasket being sufficiently yieldable and resilient to provide for movement of said inwardly extending flange portions over the end portions of said gasket into said groove and return of the material adjacent said groove into engagement with the axially inner surfaces of said inwardly extending flange portions to prevent relative separation between said inwardly extending flange portions, and rigid coupling means connecting the outwardly extending abutted flange portions to prevent separation therebetween, the inner surface of said gasket defining a flow passage of a size sufficient to provide for substantially unrestricted fluid flow therethrough, the tapered wall thickness of the end portions of said gasket and the interfitting relation between the end portions of the tubes and gasket being effective to develop balanced forces within the material of said gasket as a result of pressure of fluid acting against the inner surface of said gasket which assist said gasket in holding said inwardly extending flange portions against relative separation.

2. A construction as defined in claim 1 in which said coupling means comprises reversely bent portions on the outwardly extending flange portions of one of said tubes engageable behind the outwardly extending flange portions of the other of said tubes.

3. A construction as defined in claim 1 in which the end portions of said tube are outwardly belled, and said gasket has a longitudinally convex outer surface fitting snugly within said belled end portion and a cylindrical inner surface.

4. A construction as defined in claim 1 in which the end portions of said tube are cylindrical except for said flange portions and said gasket has a longitudinally convex inner surface and a generally cylindrical outer surface.

5. Tube coupling construction comprising a pair of aligned rigid tubes having end portions each provided with circumferentially alternated radially inwardly and outwardly extending substantially coplanar flange portions at the end thereof, the inwardly and outwardly extending flange portions of one of said tubes being abutted against the corresponding flange portions of the other tube, a connecting and sealing gasket of annular shape extending into the adjacent end portions of said tubes, said gasket having end portions of tapered wall thickness defined by converging inner and outer surfaces, one of said surfaces being cylindrical, the other of said surfaces being smoothly convexly curved in axial section, the outer surface of said gasket having an annular groove intermediate its ends, the portions of said gasket at opposite sides of said groove fitting snugly within the inner surfaces of the end portions of said tubes, the inwardly extending flange portions of said tubes being received within said groove and being in abutment with each other therein, the material of said gasket being sufficiently yieldable and resilient to provide for movement of said inwardly extending flange portions over the end portions of said gasket into said groove and return of the material adjacent said groove into engagement with the axially inner surfaces of said inwardly extending flange portions to oppose separation between said inwardly extending flange portions, and rigid coupling means connecting the outwardly extending abutted flange portions to prevent separation therebetween.

References Cited in the file of this patent

UNITED STATES PATENTS

| | | |
|---|---|---|
| 561,576 | Flannery | June 9, 1896 |
| 617,728 | Farrey | Jan. 17, 1899 |
| 872,442 | Morris | Dec. 3, 1907 |
| 1,043,412 | Faunce | Nov. 5, 1912 |
| 1,119,564 | Austin et al. | Dec. 1, 1914 |
| 1,226,419 | Turner | May 15, 1917 |
| 1,228,541 | Durbin | June 5, 1917 |
| 1,561,033 | Spencer | Nov. 10, 1925 |
| 1,782,484 | Spencer et al. | Nov. 25, 1930 |
| 1,876,455 | Inshaw | Sept. 6, 1932 |
| 2,168,631 | Scott | Aug. 8, 1939 |
| 2,416,657 | Trevaskis | Feb. 25, 1947 |
| 2,438,145 | Caminez | Mar. 23, 1948 |
| 2,472,620 | Rhodes et al. | June 7, 1949 |
| 2,517,290 | De Moude et al. | Aug. 1, 1950 |
| 2,650,115 | Taylor | Aug. 25, 1953 |

FOREIGN PATENTS

| | | |
|---|---|---|
| 918 | Great Britain | Aug. 20, 1883 |
| 668,917 | Great Britain | Mar. 26, 1952 |